(12) United States Patent
Mariampillai et al.

(10) Patent No.: US 11,484,741 B2
(45) Date of Patent: *Nov. 1, 2022

(54) WATER-ENHANCING, FIRE-SUPPRESSING HYDROGELS

(71) Applicant: FIREREIN INC., Napanee (CA)

(72) Inventors: Brian Ernest Mariampillai, Inverary (CA); Yun Yang, Kanata (CA)

(73) Assignee: FIREREIN INC., Napanee (CA)

( * ) Notice: Subject to any disclaimer, the term of this patent is extended or adjusted under 35 U.S.C. 154(b) by 105 days.

This patent is subject to a terminal disclaimer.

(21) Appl. No.: 16/811,198

(22) Filed: Mar. 6, 2020

(65) Prior Publication Data

US 2020/0206552 A1 Jul. 2, 2020

Related U.S. Application Data

(60) Division of application No. 16/192,383, filed on Nov. 15, 2018, now Pat. No. 10,625,108, which is a
(Continued)

(51) Int. Cl.
*A62D 1/00* (2006.01)
*C08J 3/075* (2006.01)
(Continued)

(52) U.S. Cl.
CPC ............ *A62D 1/0064* (2013.01); *A23D 7/00* (2013.01); *C08G 65/2609* (2013.01); *C08J 3/075* (2013.01)

(58) Field of Classification Search
None
See application file for complete search history.

(56) References Cited

U.S. PATENT DOCUMENTS 2,551,919 A * 5/1951 Williamson ......... A62C 99/009
169/14
3,976,580 A * 8/1976 Kaminstein .......... A62D 1/0064
252/2
(Continued)

FOREIGN PATENT DOCUMENTS

CN 102240431 A 11/2011
CN 103263747 A 8/2013
(Continued)

OTHER PUBLICATIONS

[Wu, K.; et al. ind. Eng. Chem. Res. 2009, 46, 3150-3157].*
(Continued)

*Primary Examiner* — Joseph D Anthony
(74) *Attorney, Agent, or Firm* — Barnes & Thornburg LLP

(57) ABSTRACT

The present application provides water-enhancing, fire-suppressing hydrogels that are formulated to minimize toxicity and negative environmental impact. The present application provides a composition comprising: (i) at least one thickening agent; (ii) at least one liquid medium; and, optionally, (iii) one or more suspending agents, wherein the composition consists of >75%, by weight, consumer-grade components and wherein the composition is a concentrate that can be mixed with water or an aqueous solution to form a fire-suppressing, water-enhancing hydrogel. Each of the at least one thickening agent, suspending agent and liquid medium can be non-toxic and biodegradable. Also provided are the fire-suppressing, water-enhancing hydrogel and methods of production and use thereof during fire fighting or fire prevention.

25 Claims, 2 Drawing Sheets

Related U.S. Application Data continuation of application No. 15/529,863, filed as application No. PCT/CA2015/051235 on Nov. 26, 2015, now Pat. No. 10,159,863.

(60) Provisional application No. 62/084,965, filed on Nov. 26, 2014.

(51) Int. Cl.
  C08G 65/26 (2006.01)
  A23D 7/00 (2006.01)

(56) References Cited

U.S. PATENT DOCUMENTS

| | | | |
|---|---|---|---|
| 5,124,363 A | 6/1992 | Stem | |
| 5,213,834 A * | 5/1993 | Ikeda | A23C 9/137 |
| | | | 426/573 |
| 7,189,337 B2 * | 3/2007 | Sortwell | A62D 1/0042 |
| | | | 169/44 |
| 7,476,346 B2 | 1/2009 | Hagquist et al. | |
| 8,192,653 B2 * | 6/2012 | Hagquist | A62D 1/005 |
| | | | 252/606 |
| 8,257,607 B1 | 9/2012 | Johnson et al. | |
| 8,408,323 B2 | 4/2013 | Hagquist et al. | |
| 10,159,863 B2 * | 12/2018 | Mariampillai | A62D 1/0064 |
| 10,625,108 B2 | 4/2020 | Mariampillai et al. | |
| 2006/0188940 A1 * | 8/2006 | Cima | C40B 60/14 |
| | | | 435/7.1 |
| 2007/0252116 A1 * | 11/2007 | Gelmont | C08K 5/0066 |
| | | | 252/601 |
| 2009/0212251 A1 | 8/2009 | Taylor | |
| 2010/0113630 A1 * | 5/2010 | Mark | C09K 21/08 |
| | | | 521/107 |
| 2012/0222872 A1 | 9/2012 | Hagquist et al. | |
| 2013/0180738 A1 | 7/2013 | Kim et al. | |
| 2013/0264509 A1 | 10/2013 | Shalev et al. | |
| 2018/0021612 A1 * | 1/2018 | McLean | A62D 1/0064 |
| | | | 252/2 |

FOREIGN PATENT DOCUMENTS

| | | | |
|---|---|---|---|
| EP | 2774906 | 9/2014 | |
| JP | 2008-518735 | 6/2008 | |
| SI | 21660 | 12/2003 | |
| UA | 10405 | 12/1996 | |
| WO | 99/43391 | 9/1999 | |
| WO | 2006/052245 | 5/2006 | |
| WO | WO 2006/052245 A1 * | 5/2006 | A62D 1/00 |
| WO | 2011/127037 | 10/2011 | |
| WO | 2013/055579 | 4/2013 | |
| WO | WO 2013/055579 A1 * | 4/2013 | A62D 1/00 |

OTHER PUBLICATIONS

Search Report for RU 2017122170/05 dated Apr. 23, 2019, English translation provided.

Extended European Search Report, Application No. 15864205.8-1105/3223920, PCT/CA2015051235.

International Preliminary Report on Patentability; PCT Application No. PCT/CA2015-051235, dated Mar. 10, 2017.

International Search Report and Written Opinion, PCT Application No. PCT/CA2015/051235, dated Mar. 1, 2016.

* cited by examiner

WATER-ENHANCING, FIRE-SUPPRESSING HYDROGELS

CROSS-REFERENCE TO RELATED APPLICATIONS

The present application is a Divisional Application of U.S. patent application Ser. No. 16/192,383 filed Nov. 15, 2018, which is a Continuation Application of U.S. patent application Ser. No. 15/529,863 filed May 25, 2017, which is a National Phase application filed under 35 U.S.C. § 371 of PCT International Application No. PCT/CA2015/051235 with an International Filing Date of Nov. 26, 2015, which claims the benefit of priority of U.S. Provisional Application No. 62/084,965, filed Nov. 26, 2014, the entire contents of which are hereby incorporated by reference as though fully set forth herein in their entirety.

FIELD OF THE INVENTION

The present application pertains to the field of firefighting agents. More particularly, the present application relates to water-enhancing, fire-suppressing hydrogels.

INTRODUCTION

Fire is a threat to life, property, and natural, suburban, and urban landscapes worldwide. Forest, brush, and grassland fires destroy acres of natural and suburban landscapes each year; with the total average of acres lost to wildfire increasing since about 1984 [http://climatedesk.org/2014/06/this-is-how-much-America-spends-putting-out-wildfires/]. This destruction is not only in terms of a loss of timber, wildlife and livestock, but also in erosion, disruption to watershed equilibria, and related problems in natural environments. In suburban, urban, and industrial areas, fire can result in billions of dollars in damage from loss of lives, property, equipment, and infrastructure; not only from the fire itself, but also from water used to extinguish it.

Fire and its constructs are often described by the 'Fire Tetrahedron', which defines heat, oxygen, fuel, and a resultant chain reaction as the four constructs required to produce fire; removing any one will prevent fire from occurring. There are five classes of fire: Class A, which comprises common combustibles, such as wood, cloth, etc.; Class B, which comprises flammable liquids and gases, such as gasoline, solvents, etc.; Class C, which comprises live electrical equipment, such as computers, etc.; Class D, which comprises combustible metals, such as magnesium, lithium, etc.; and, Class K, which comprises cooking media, such as cooking oils and fats. Water is usually a first line of defence against certain classes of fires (e.g. class A), and is used not only to extinguish said fires, but also prevent them from spreading; due, at least in part, to water's ability to absorb heat via its high heat capacity (4.186 J/g° C.) and heat of vaporization (40.68 kJ/mol), thus cooling surfaces, as well as its ability to physically displace air surrounding a fire, and deprive it of oxygen.

There are, however, disadvantages to using water to fight fire and/or prevent it from spreading to nearby structures. Often, most of the water directed at a structure does not coat and/or soak into the structure itself to provide further fire protection, but rather is lost to run off and wasted; what water does soak into a structure is usually minimal, providing limited protection as the absorbed water quickly evaporates. Further, water sprayed directly on a fire tends to evaporate at the fire's upper levels, resulting in significantly less water penetrating to the fire's base to extinguish it.

Consequently, significant manpower and local water resources can be expended to continuously reapply water on burning structures to extinguish flames, or on nearby structures to provide fire protection.

To overcome water's limitations as a fire-fighting resource, additives have been developed to enhance water's capacity to extinguish fires. Some of these additives include water-swellable polymers, such as cross-linked acrylic or acrylamide polymers, that can absorb many times their weight in water, forming gel-like particles; once dispersed in water, these water-logged particles can be sprayed directly onto a fire, reducing the amount of time and water necessary for fighting fires, as well as the amount of water run off (for example, see U.S. Pat. Nos. 7,189,337 and 4,978,460).

Other additives include acrylic acid copolymers cross-linked with polyether derivatives, which are used to impart thixotropic properties on water (for examples, see U.S. Pat. Nos. 7,163,642 and 7,476,346). Such thixotropic mixtures thin under shear forces, allowing them to be sprayed from hoses onto burning structures or land; once those shear forces are removed, the mixture thickens, allowing it to cling to, and coat, surfaces, extinguish flames, and prevent fire from spreading, or the structure from re-igniting.

Additives employed in current commercial products are not naturally sourced and are not readily biodegradable. A drawback associated with these polymeric additives is that they can persist in the environment following their use during firefights, and/or can bio-accumulate or cause ill effects on surrounding environment.

Research into non-toxic, biodegradable, renewable, and/or naturally-sourced materials has increased in an effort to replace halogen-based/synthetic firefighting materials, and reduce their environmental impact. Thermoplastic starches (TPS), such as modified starches or starch-copolymers, have been proposed by those skilled in the art as one such non-toxic, biodegradable, renewable, and/or naturally-sourced material. Starch is not a natural thermoplastic at room temperature, however, at elevated temperatures it can form a hydrogel when mixed with water; alternatively, it can be further blended with plasticizers, such as glycerol, to also form hydrogels [Wu, K.; el al. *Ind. Eng. Chem. Res.* 2009, 48, 3150-3157]. Blending TPS with polymers such as poly-vinylalcohol (PVA) [Bao, Z.; el al. *Adv. Mater. Res.* 2012, 518-523, 817-820] or polylactide (PLA) [Wu, K.; el al. *Ind. Eng. Chem. Res.* 2011, 50, 713-720] can reportedly increase TPS' hydrophilic properties, and turns TPS into intumescent (swells upon heat exposure) flame retardant materials. It has also been reported that, if TPS are reinforced with biodegradable natural fibers [Katalin, B.; el al. *Polimery,* 2013, 58, 385-394], its flammability can be reduced. Alternatively, TPS can be blended with clay to reduce its flammability a nano-size clay (Cloisite 30B) can be solvent-blended with starch to improve its thermal stability [Swain, S. k.; el al. *Polym. Comp.* 2013, Ahead of print]. Preparation of such modified starches, however, often requires chemical reagents and advanced syntheses.

In turn, superabsorbent polymers have garnered much attention due to their broad applications in hygienic products, agricultural adjuvant, and pharmaceuticals, etc [Liu, L. S.; el al. *Polym.* 2012, 4, 997-1011]. They are also hydrogel materials: polymeric materials with the ability to swell and retain a significant amount of water (up to 99.9% by weight) without dissolving in said water. As synthetic hydrogels are not generally biodegradable, there are a number of natural starch resources being investigated as potential hydrogels, such as: cornstarch [Kuang, J.; el al. *Carbohydrate Polym.* 2011. 83, 284-290], chitosan [Nanaki. S. G.; el al. *Carbohydrate Polym.* 2012, 1286-1294], guar gum [Bocchinfuso, G.; el al. *J. Phy. Chem. B*2010, 114, 13059-13068], cellulose and its derivatives [Sadeghi, M. el al. *J. Appl. Polym. Sci.* 2008, 108, 1142-1151], alginate and its derivatives, etc. Only a few of these starches are commercially available (e.g. cellulose derivatives, hydroxyethyl-starch)

There remains a need for fire fighting or fire retardant compositions made from water-enhancing additives that are naturally sourced and/or consumer grade, which are non-toxic and/or readily biodegradable.

The above information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide water-enhancing, fire-suppressing hydrogels. In accordance with an aspect of the present application, there is provided a composition comprising: (i) at least one thickening agent; (ii) at least one liquid medium; and, optionally, (iii) one or more suspending agents, wherein the composition consists of >75%, by weight, consumer-grade components and wherein the composition is a concentrate that can be mixed with water or an aqueous solution to form a fire-suppressing, water-enhancing hydrogel. Each of the at least one thickening agent, suspending agent and liquid medium can be non-toxic and biodegradable.

In one embodiment, the concentrated composition of claim 1, wherein the composition comprises: (i) 10-75 wt % of at least one thickening agent; (ii) 0-10 wt % of at least one suspending agent; and (iii) 15-90 wt % of at least one liquid medium. The concentrate can further comprise one or more additives, each of which is optionally non-toxic and biodegradable. Examples of additives that can be incorporated in the concentrate are: salts an anti-microbial agents, an anti-fungal agents, antioxidants, colorants, clays, dispersing agents. These additives can be incorporated alone or in any combination of any two or more additives.

In certain embodiments the concentrate composition has a viscosity of ≥1000 cP, ≥2500 cP, ≥5000 cP, or ≥10 000 cP, when measured using a Brookfield LVDVE viscometer with a CS-34 spindle at 6.0 rpm.

The thickening agent can be a solid or a liquid under ambient conditions. Suitable thickening agents include, for example, gums, starches or combinations one or more gums and one or more starches. Suitable gums include, but are not limited to guar gums, xanthan gums, sodium alginate, agar, or locust bean gums, or combinations thereof. In specific examples of the present concentrate, the thickening agent comprises xanthan gum, gaur gum, or a combination thereof.

Suitable starches that can be used as thickening agents in the present concentrate include, but are not limited to cornstarch, potato starch, tapioca, rice starch, carboxymethylcellulose sodium salt, or any combination thereof. In specific examples of the present concentrate, the thickening agent comprises cornstarch.

In certain embodiments, the concentrate composition comprises a suspending agent, which can be a surfactant, emulsifier or both. For example, the concentrate can comprises a suspending agent, which comprises lecithin, lysolecithin, polysorbate, sodium caseinate, monoglyceride, fatty acid, fatty alcohol, glycolipid, or protein, or any combination thereof. In a particular example, the suspending agent is lecithin.

In accordance with another embodiment, the liquid medium in the concentrate is an edible oil, glycerol, or low molecular weight polyethylene glycol (PEG), or any combination thereof. In a particular embodiment, the PEG is PEG200-PEG400. In another embodiment, the edible oil is a nut oil, seed oil, plant oil, vegetable oil, or canola oil, or combination thereof. In a specific example the concentrate comprises an edible oil, which is canola oil.

In a particular embodiment, the concentrate comprises: (i) 15-25 wt % xanthan gum; (ii) 10-20 wt % guar gum; (iii) 10-20 wt % cornstarch; (iv) 1-5 wt % lecithin; and (v) 30-64 wt % canola oil. Optionally, the concentrate additionally comprises 0.1-2.5% of a fatty alcohol, such as oleyl alcohol.

The present concentrate composition is formulated to minimize toxicity and negative environmental impact. Accordingly, in certain embodiments, the composition consists of >80%, >85%, >90%, >95%, >98% or approximately 100%, by weight, consumer-grade components.

In accordance with another aspect, there is provided a hydrogel, comprising: about 0.1-30 wt % of the concentrate composition described above; and 70-99.9 wt % of water or an aqueous solution, wherein the hydrogel is a water-enhancing, fire-suppressant, useful for fire-fighting, fire-suppression, and/or fire-prevention. In certain embodiments, the hydrogel comprises the concentrate composition at a weight percentage of from about 0.1 to about 1 wt %, from about 1 to about 5 wt %, from about 5 to about 10 wt % or from about 15 to about 30 wt %. In a particular embodiment, the concentrate's weight percentage in the hydrogel is 1-5 wt %.

In certain embodiments, the hydrogel's viscosity is 0.1-1 cP, 1-5 cP, 5-10 cP, 10-15 cP, 15-30 cP, 30-60 cP, 60-90 cP, 90-120 cP, 120-150 cP, or >150 cP when measured with a Viscolite 700 viscometer. The hydrogel can exhibit non-Newtonian fluidic, pseudoplastic and/or thixotropic behaviour.

In one embodiment, the viscosity of the decreases with application of stress and, optionally, increases after the stress ceases or has been removed. The viscosity increase can occur over a short time period, such as ≤60 s, ≤40 s, ≤20 s, ≤10 s, or ≤5 s.

In one embodiment, the hydrogel adheres to surfaces to which it is applied. In one example, the hydrogel having decreased viscosity is applied (e.g., by spraying) to flow into, coat, and/or adhere to surface abrasions and/or gaps. As a result of the application process finishing, the stress on the hydrogel ceases and the viscosity of the hydrogel can increase such that the hydrogel remains on the surfaces to which it was applied without running off, or with minimal runoff in comparison to currently used fire-suppressing formulations.

The hydrogel described herein functions to suppress and/or extinguish fire, when applied to a burning surface, or functions to prevent fire ignition when applied to a non-burning surface.

In accordance with another aspect, there is provided method of making a water-enhancing, fire-suppressing hydrogel comprising: (i) combining the concentrate composition described herein with water or an aqueous solution; and (ii) mixing the concentrate and aqueous solution to obtain an essentially homogenous hydrogel. In one embodiment, the weight percent of the concentrate is selected to achieve a particular viscosity and/or surface adhesion in the hydrogel. In a particular example, the concentrate is introduced such that its weight percent in the final hydrogel is from about 1 to about 5 wt %.

In one embodiment, the step of combining comprises manual addition or direct, mechanical injection of the concentrate. Depending on the equipment used, the water or aqueous solution is held in a tank external to, or on-board, a vehicle or portable device used in fire-fighting.

In one embodiment, the mixing step comprises manual agitation; mechanical agitation, circulation or stirring, or application of shear forces (for example, from pressurized flow through a fire hose).

In accordance with another aspect, there is provided a kit, comprising: (i) the concentrate composition as described herein in a container suitable to permit or facilitate mixing of the concentrate composition with water or an aqueous solution; and (ii) directions for producing a hydrogel from the concentrate composition.

BRIEF DESCRIPTION OF THE FIGURES

For a better understanding of the present invention, as well as other aspects and further features thereof, reference is made to the following description which is to be used in conjunction with the accompanying drawings, where.

Figure 1:
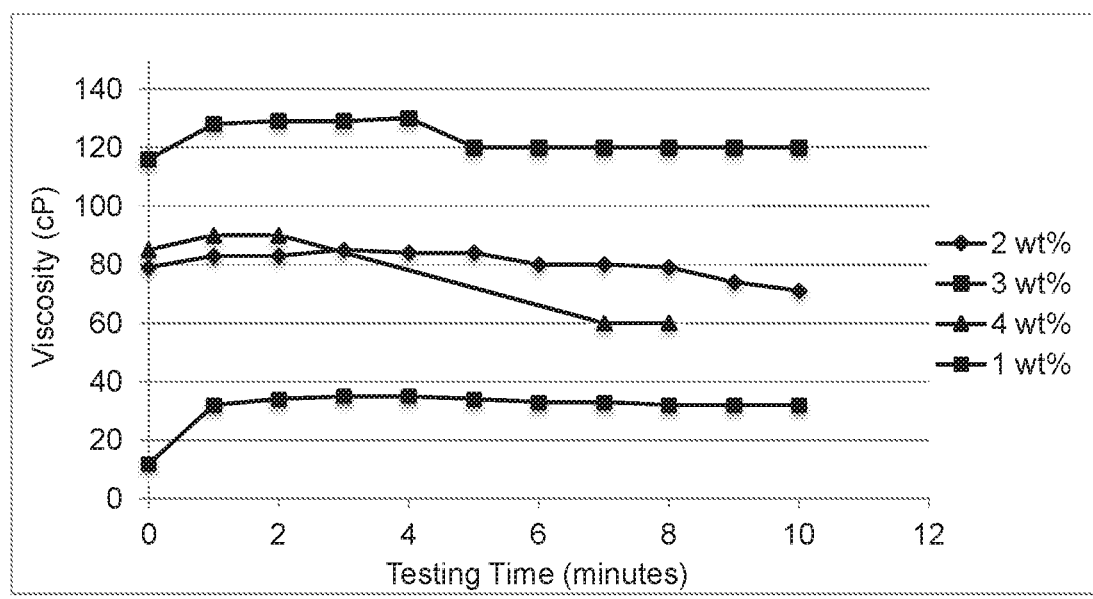
FIG. 1 depicts graphical results of canola-based hydrogels' viscosity changing with time as the hydrogel is being discharged from a 100 ft fire hose.

Table 1 outlines general formulations of select liquid concentrates identified for further development;

Table 2 outlines screening results for various concentrate thickening agents;

Table 3 outlines initial liquid concentrate formulations and adhesion test results;

Table 4 outlines PEG/glycerol-based hydrogels with salt additives adhesion test results;

Table 5 outlines canola-based hydrogels with salt additives adhesion test results;

Table 6 outlines settlement and front-flow test results of liquid concentrates after lecithin addition;

Table 7 outlines viscosity and adhesion test results for select liquid concentrates;

Table 8 outlines effects of starch on liquid concentrate viscosity and adhesion;

Table 9 outlines effect of xanthan gum particle size on viscosity;

Table 10 outlines effect of increasing solids content in liquid concentrates on viscosity;

Table 11 outlines viscosities of 20 L batches of a canola-based liquid concentrate;

Table 12 outlines a PEG300-based liquid concentrate formulation and its viscosity; and Table 13 outlines initial flame tests carried out using initial hydrogel formulations.

DETAILED DESCRIPTION

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

As used herein, the term "consumer-grade components" refers to food-grade, personal care-grade, and/or pharmaceutical-grade components. The term "food-grade" is meant to mean safe for use in food, such that ingestion does not, on the basis of the scientific evidence available, pose a safety risk to the health of the consumer. The term "personal care-grade" is meant to mean safe for use in topical application such that, topical application does not, on the basis of the scientific evidence available, pose a safety risk to the health of the consumer. The term "pharmaceutical-grade" is meant to mean safe for use in a pharmaceutical product administered by the appropriate route of administration, such that administration does not, on the basis of the scientific evidence available, pose a safety risk to the health of the consumer.

As used herein, the term "non-toxic" is meant to mean non-poisonous, non-hazardous, not composed of poisonous materials that could harm human health if exposure is limited to moderate quantities and not ingested. Non-toxic is meant to connote harmlessness to humans and animals in acceptable quantities if not ingested and even upon ingestion, does not cause immediate serious harmful effects to the person or animal ingesting the substance. The term non-toxic is not meant to mean able to be swallowed or injected or otherwise taken in by animals, plants, or other living organisms. The term non-toxic may mean the substance is classified as non-toxic by the Environmental Protection Agency (EPA), the World Health Organization (WHO), the Food and Drug Administration (FDA), Health Canada, or the like. The term non-toxic is therefore not meant to mean non-irritant or not causing irritation when exposed to skin over prolonged periods of time or otherwise ingested.

When used to describe the concentrate or the resultant fire-suppressing hydrogel of the present application, the term non-toxic indicates that the composition is non-toxic to humans at concentrations and exposure levels required for effective use as fire-fighting, suppressing, and/or preventing agents, without the need for protective gear.

The term "surface abrasion(s)" as used herein refers to any deviation from a surface's structural norm, such as, but not limited to, holes, fissures, gaps, gouges, cuts, scrapes, cracks, etc.

As used herein, the term "surface adhesion" refers to the ability of a composition to coat and/or adhere to a surface at any orientation (e.g., vertical cling). In referring to the hydrogel compositions of the present application, the term "surface adhesion" further refers to the ability of the hydrogel to adhere to a surface such that adequate fire fighting, suppression, and/or protection is afforded as a result of the surface being coated by the hydrogel.

As detailed below, the presently disclosed hydrogel, and concentrate used to prepare the hydrogel, have been formulated to be non-toxic and environmentally benign. This has been achieved through the present finding that consumer-grade materials can be used successfully to prepare a water-enhancing fire-suppressant. Accordingly, the present compositions overcome many of the drawbacks associated with previous attempts at non-toxic, biodegradable, renewable, and/or naturally-sourced fire-suppressing agents.

Hydrogel-Forming Concentrates and their Components

The present application provides a concentrate composition, for use in producing hydrogels in situ, which comprises >75% non-toxic, consumer-grade components. In certain embodiments, the components of the concentrate composition can also be biodegradable, renewable and/or naturally-sourced. Optionally, the concentrate composition comprises >80%, >85%, >90%, >95% or >98% non-toxic, consumer-grade components.

In one aspect, the concentrate is a liquid concentrate that comprises at least one thickening agent, a liquid medium, and at least one suspending agent. Such a liquid concentrate can be, for example, a solution, a suspension or a slurry. Alternatively, the concentrate is a powder or other solid mixture, which comprises at least one thickening agent and at least one suspending agent. In either alternative, the concentrate is formulated to be mixed with water, or an aqueous solution, to form a hydrogel having fire suppressant or retardant properties.

Thickening Agents

Hydrogel-forming concentrates, as herein described, require at least one species to act as a thickening agent to aid in generating a hydrogel. A thickening agent can be, for example, a polymer. Starch, which is a biodegradable, naturally-sourced polymer, can form gels in the presence of water and heat. Starch-based hydrogels can act as fire retardants due to their high water retaining and surface-adhesion capabilities [Ioanna G. Mandala (2012). Viscoelastic Properties of Starch and Non-Starch Thickeners in Simple Mixtures or Model Food, Viscoelasticity—From Theory to Biological Applications, Dr. Juan De Vicente (Ed.), ISBN: 978-953-51-0841-2, InTech, DOI: 10.5772/50221. Available from: http://www.intechopen.com/books/viscoelasticity-from-theory-to-biological-applications/viscoelastic-properties-of-starch-and-non-starch-thickeners-in-simple-mixtures-or-model-food]. One example of a natural starch-based, hydrogel-forming thickening agent is carboxymethylcellulose sodium salt, which has found use in personal lubricants, toothpastes, and ice creams as a thickener; it is food-grade and biodegradable, and can absorb water at concentrations as low as 1% in water. Other types of starch that are viable for use in the present concentrate include, but are not limited to, corn starch, potato starch, tapioca, and/or rice starch.

Other viable naturally sourced, biodegradable thickening agents include natural gums, such as, but not limited to, guar gum, xanthan gum, sodium alginate, agar, and/or locust bean gum, some of which are used as thickeners in food, pharmaceutical and/or cosmetic industries. For example, guar gum is sourced primarily from ground endosperms of guar beans, and reportedly has a greater water-thickening potency than cornstarch; xanthan gum is produced by *Xanthomonascamperstris* [Tako, M. et al. *Carbohydrate Research,* 138 (1985) 207-213]. At low concentrations, xanthan gum or guar gum can confer an increase in viscosity to aqueous solutions; and, that imparted viscosity can change depending on what shear rates the solutions are exposed to, due to the gums' shear-thinning or pseudoplastic behaviour. Further, it has been observed that mixtures of xanthan and guar gum exhibit a synergistic effect: in addition to their shear-thinning properties, mixtures of xanthan and guar gum impart higher viscosities to aqueous solutions than each gum individually [Casas, J. A., et al. *J Sci Food Agric* 80:1722-1727, 2000].

Liquid Medium

As noted above, the hydrogel-forming concentrate can be a mixture of solid components (such as a powder), or a liquid suspension/solution. Either a solid or liquid concentrate could be mixed with water to form a water-enhancing, fire-suppressing hydrogel; however, it would be understood by one skilled in the art that pre-dissolving or pre-suspending a concentrate's components in a liquid medium can facilitate its mixing with water, and potentially increase the rate and/or ease at which a hydrogel forms. Examples of non-toxic, consumer-grade liquid mediums include, but are not limited to, edible oils, such as nut/seed oils, or vegetable/plant oils, glycerol, and low molecular weight polyethylene glycol (PEG).

In addition to being naturally-sourced and/or food-grade, liquid mediums such as vegetable oil, glycerol, and PEG resist freezing at sub-zero temperatures; thus, concentrates formed with such liquid mediums can maintain their utility for forming hydrogels under winter and/or arctic conditions. Further, some liquid mediums, such as glycerol and PEG, are water-miscible, which can also enhance the ability of the concentrate to effectively mix with water and form a hydrogel.

In certain embodiments, the concentrate comprises a mixture of more than one liquid media.

Suspending Agents

Hydrogel-forming liquid concentrates, formed from solid components (e.g., thickening agents) suspended or dissolved in a liquid medium (e.g., vegetable oil), may exhibit settling of solid components over time. If such settling were to occur, the liquid concentrate can be physically agitated in order to re-suspend or re-dissolve its components. Alternatively, a suspending agent (e.g., surfactant or emulsifier), or a combination of suspending agents, can be added to the liquid concentrate to stabilize the composition, or to facilitate keeping solid components suspended or dissolved in the liquid medium, either indefinitely, or for a length of time sufficient to maintain a concentrate's utility for hydrogel formation.

Examples of non-toxic, consumer-grade surfactants and/or emulsifiers include, but are not limited to, lecithins, lysolecithins, polysorbates, sodium caseinates, monoglycerides, fatty acids, fatty alcohols, glycolipids, and/or proteins [Kralova, I., et al. Journal of Dispersion Science and Technology, 30:1363-1383, 2009]. Such surfactants can be provided as solids or liquids. The addition of a surfactant, or combination of surfactants, to the concentrate, can increase the viscosity of the concentrate and/or increase the viscosity of the hydrogel formed following dilution of the concentrate with water. This effect of the surfactant, or combination of surfactants, occurs as a result of their suspension action, and/or by increasing the amount of material that can be included in the concentrate or the resultant hydrogel.

In certain embodiments, the surfactant(s) used in the concentrate is a liquid. As would be readily appreciated by one skilled in the art, such liquid surfactants can be more easily mixed with the liquid medium of a liquid concentrate than can a solid surfactant. Accordingly, the liquid surfactant(s) may, in some examples, be more effective at maintaining the solid components in suspension and/or solution.

In certain embodiments, the concentrate contains more than one surfactant. The surfactants can be all solid surfactants, all liquid surfactants or a combination of liquid and solid surfactants.

Additives

Other components, or additives, can be added to the concentrate in order to affect or alter one or more properties of the concentrate or the hydrogel formed from the concentrate. The appropriate additive(s) can be incorporated as required for a particular use. For example, additives can be added to affect the viscosity and/or stability of the concentrate, and/or the resultant hydrogel. Additional additives that can be incorporated in the present concentrate and hydrogel compositions include, but are not limited to, pH modifiers, dispersing agents (e.g., surfactants, emulsifiers, clays), salts, anti-microbial agents, anti-fungal agents and dyes/coloring agents. Specific, non-limiting examples of non-toxic, consumer-grade additives include: sodium and magnesium salts (e.g., borax, sodium bicarbonate, sodium sulphate, magnesium sulphate), which can affect hydrogel viscosity and/or stability [Kesavan, S. et al., Macromolecules, 1992, 25, 2026-2032; Rochefort, W. E., J. Rheol. 31, 337 (1987)]; chitosan or epsilon polylysine, which can act as anti-microbials [Polimeros: Ciência e Tecnologia, vol. 19, no 3, p. 241-247, 2009; http://www.fda.gov/ucm/groups/fdagov-public/@fdagov-foods-gen/documents/document/ucm 267372.pdf (accessed Sep. 26, 2014)], and pectin, which can aid in the formation of hydrogels.

As would be readily appreciated by a worker skilled in the art, the additive(s) can be added to the concentrate, or the additive(s) can be added during formation of the hydrogel, or to the additive(s) can be added to the hydrogel.

The concentrate is prepared by mixing the components in any order, typically under ambient conditions. The relative amounts of each component, in particular the thickening agent, liquid agent, and, when present, the suspending agent, are selected based, at least in part, on the desired viscosity of the concentrate. Once formed, the concentrate has a shelf life of about 30 days, 1-3 months, 3-6 months, 6-9 months, 9-12 months, 12-15 months, 15-18 months. 18-21 months, 21-24 months, or ≥24 months.

Water-Enhancing, Fire-Suppressing Hydrogels

The present application further provides water-enhancing, fire-suppressing hydrogels formed from the concentrate described above, which comprise non-toxic, consumer-grade components. In one embodiment, the hydrogel is used to fight domestic, industrial, and/or wild fires by eliminating at least one construct of the "fire tetrahedron": which consists of heat, fuel, oxygen, and chain reaction. In another embodiment, the hydrogel is applied to burning or fire-threatened structures, such as edifices and/or landscape components (e.g., trees, bushes, fences) via firefighting equipment. In one embodiment, the hydrogels described herein can be used to fight Class A fires (i.e., wood and paper fires); in another embodiment, said hydrogels are suitable for fighting Class B fires (i.e., oil and gas fires).

Hydrogel Formation and Application

A water-enhancing, fire-suppressing hydrogel as herein described can be formed by mixing a concentrate, as described above, with water or an aqueous solution. When applied using firefighting equipment, the concentrate is mixed with the equipment's water supply, and then applied to target objects (such as, structures, edifices and/or landscape elements) to extinguish, suppress or prevent fire or to protect from fire. Firefighting equipment useful in applying the hydrogels of the present application, comprises a means for mixing the concentrate with water or an aqueous solution and means for spraying the resultant hydrogel onto the target objects. In one embodiment, the firefighting equipment additionally comprises a reservoir for holding the concentrate until required; the reservoir is in fluid communication with the mixing means such that the concentrate can be moved from the reservoir to the mixing means for mixing with the water or aqueous solution. In another embodiment, the firefighting equipment additionally comprises means for introducing water or an aqueous solution to the means for mixing, or a reservoir fluidly connected to the means for mixing, such that the water or aqueous solution can be moved from the reservoir to the mixing means for mixing with the concentrate. Non-limiting examples of firefighting equipment include spray nozzle-equipped backpacks, or sprinkler systems. The firefighting equipment can be mounted on or in a vehicle, such as, a truck, airplane or helicopter.

In accordance with one embodiment, in which the hydrogel is used for firefighting using fire trucks, or other firefighting vehicles, including aircrafts, the herein described hydrogels are formed and used via the following, non-limiting process: the hydro-gel forming concentrate is added to a truck's water-filled dump tank and/or other portable tank, and mixed with the water via a circulating hose, or equivalent thereof; pumping the hydrogel, once formed, out of the tank(s), and applying the hydrogel to the target objects (e.g., edifices or landscape elements), via a hard suction hose, or equipment equivalent thereof.

In an alternative embodiment, the concentrate is added directly to a vehicle's onboard water tank, either manually or via an injection system, and mixed via circulation in the tank. In one example of this embodiment, the injection system comprises an 'after the pump' system, which injects specified amounts of concentrate into water that has passed through the vehicle's pump, and is about to enter the fire hose; friction of the water moving through the hose assists in mixing the concentrate with the water to produce the hydrogel in the hose. In another specific example, the injection system pumps the concentrate from a dedicated reservoir to an injection pipe that introduces concentrate into the water just prior to the hose line; a computerized system calculates water flow via a flow meter on said injection pipe to inject required amounts of concentrate into the pipe and hose stream via a specially designed quill.

Further, fire-fighting vehicles suitably equipped with an in-line injection system, allow the concentrate to be added directly in-line with the water, which can then be mixed via physical agitation and/or shear forces within the hose itself.

As would be readily appreciated by a worker skilled in the art, although the methods for hydrogel formation described above may specifically refer to a fire fighting truck, such methods are equally applicable to firefighting using aircraft, such as airplanes or helicopters, where water, or other aqueous solutions, is air dropped from a tank either contained within, or suspended by, the aircraft.

In another embodiment, the hydrogel formulation is made from the concentrate at the time of firefighting using firefighting backpacks. In this embodiment the concentrate can be added to directly to the backpack's water-filled reservoir, and manually or mechanically shaken to form the hydrogel. Once formed, the hydrogel can be applied to requisite objects, or surfaces, via the backpacks' spray-nozzle.

In another embodiment, the concentrates as herein described can be added to a sprinkler system's water supply, such that, upon activation as a result heat, smoke, and/or fire detection, the system sprays the hydrogel, as described herein, rather than simply water (as in current practice). In one embodiment, once a sprinkler system is activated, a dedicated pump system injects concentrate into the sprinkler's water system, producing a hydrogel with properties compatible with the sprinkler's flow requirements, prior to being applied to an object or area (e.g., an edifice, room or landscape area). In another embodiment, the sprinkler system comprises sprinkler heads designed to provide an optimized spray pattern for applying a hydrogel to an object or area (e.g., an edifice, room or landscape area).

In yet another embodiment, a sprinkler system for applying the hydrogels as described here in comprises: a dedicated pump for injecting concentrate, as described herein, into the sprinkler's water system; a sprinkler head designed to provide an optimized spray pattern for hydrogel application; a computerized system to calculate water and/or hydrogel flow; a flow meter to detect water flow in dry pipes; and, a point of injection designed to introduce the concentrate into the water in such a way that is compatible with the sprinkler system and its intended use.

Hydrogel Firefighting Properties

The herein provided hydrogels, as formed from the concentrates also provided herein, are suitable for use as firefighting agents due to their physical and/or chemical properties. The hydrogels are more viscous than water, and generally resist evaporation, run-off, and/or burning when exposed to high temperature conditions (e.g., fire), due to their water-absorbing, viscosity-increasing components. These hydrogels also exhibit shear-thinning, thixotropic, pseudoplastic, and/or non-Newtonian fluidic behaviour, such that their viscosity decreases when they are subjected to stresses, such as, but not limited to, shear stresses, wherein their viscosity increases again when those stresses are removed.

Consequently, once formed, the present hydrogels can be sprayed via hoses and/or spray-nozzles onto burning objects (e.g., edifices or landscape elements) in a manner similar to water; and, once the hydrogels are no longer subjected to the stresses of being sprayed, their viscosity will increase to be greater than that of water. As a result, the hydrogels can coat and cling, at virtually any angle, to surfaces they are applied to, allowing them to extinguish fires by displacing oxygen and cooling surfaces, prevent fire flash-over, and/or further protect surfaces from re-ignition via the hydrogels' general resistance to evaporation, run-off, and/or burning.

Further, as the viscosity increase would not be instantaneous, the hydrogels can 'creep' or 'ooze' into surface abrasions or structural gaps, such as, but not limited to, cracks, holes, fissures, etc., in an edifice or landscape element, coating and protecting surfaces that would otherwise be difficult to protect with water, or other firefighting agents such as foams, due to evaporation or run-off. This will contribute an element of penetrative firefighting to a firefighter's arsenal: once the hydrogel's viscosity has increased, it will form a protective layer in, on, under and/or around said cracks, surface abrasions, structural gaps or the like. Also, use of the herein described hydrogels can minimize water damage to surfaces, since use of the hydrogels would replace the direct use of water in firefighting.

In one example, the hydrogel is applied at the head of an approaching fire, either as a fire break or to protect a property (e.g., cottage, house, or commercial or municipal building). Firefighters can proceed via "coat and approach" to protect Firefighters inside a circumference set by a coating of the hydrogel, allowing the Firefighters to create a protected route of egress.

To gain a better understanding of the invention described herein, the following examples are set forth. It should be understood that these examples are for illustrative purposes only. Therefore, they should not limit the scope of this invention in any way.

EXAMPLES

General Experimental

Materials

All materials used were naturally sourced, except polyethelyene glycol (PEG200 or PEG300), and glycerol. PEG 200/300 and glycerol are non-flammable liquids with low toxicity and are available in food/personal-care/pharmaceutical grades that are either food/food-contact/personal-care/pharmaceutical additives. Experiments were performed with chemical and/or analytical grade polyethylene glycol and glycerol; however, their chemical/physical properties were considered to be equivalent to their food grade forms. Fresh tap water was used directly without any further purification. All chemicals were used as received from commercial suppliers: xanthum gums (food grade, PO # DW-456270, Univar, 17425 NE Union Hill Road, Redmond, Wash.; Bulk Barn Canada); guar gum (P. L. Thomas&Co. Inc., 119 Head Quarters Plaza, Morristown, N.J.; Bulk Barn Canada); corn starch (Bulk Barn Canada); canola oil (FreshCo, Kingston, ON, Canada); PEG200 (Sigma-Aldrich. Oakville, ON, Canada); PEG300 (Sigma-Aldrich, Oakville, ON, Canada); and glycerol PEG200 (Sigma-Aldrich, Oakville, ON, Canada).

General Method for Producing Liquid Concentrates

Liquid concentrates were composed of at least four types of materials: thickening agents (e.g. gums), starches, liquid mediums, and optionally, other naturally-sourced and/or biodegradable additives (e.g. surfactants). All dry ingredients (e.g. gums, starch, etc.) were measured and combined in a beaker. Said ingredients were slowly mixed with a spatula until a reasonably homogenous dry mixture was obtained. A required amount of a select liquid medium (e.g. canola oil, PEG, etc.) was measured using a graduate cylinder, then added to the beaker containing said dry mixture, and stirred slowly with a spatula until no dry powder or separated liquid medium was observed. The liquid concentrate was then considered ready for use. General formulations of select liquid concentrates are outlined in Table 1.

General Method for Producing Hydrogels

Generating a hydrogel from an aforementioned liquid concentrate involved mixing the liquid concentrate (3 g) with fresh tap water (97 g) in a 150 mL beaker. A IKA T25 homogenizer was then used to thoroughly mix the components together (8600 rpm for 10 seconds), after which a hydrogel was formed.

General Test Methods for Evaluating Liquid Concentrates and/or Hydrogels

Viscosity Tests

A liquid concentrate's viscosity was determined using a Brookfield LVDVE viscometer with a CS-34 spindle. Each sample was added to a small sample adapter, and viscosity was tested at 6.0 rpm at room temperature.

Adhesion on Glass

To test a hydrogel's glass adhesion, a 3×1 inch (L×W) microscope glass slide was weighed before the slide was dipped into a hydrogel to a depth of 1.5 inches for 60 seconds. After the glass slide was removed from the hydrogel, it was suspended for 10 minutes before being weighed again. Mass of hydrogel remaining adhered to the slide was calculated from difference in weight, before and after.

Settlement Test

Each liquid concentrate is a suspension, from which solid ingredients could settle out slowly over time, resulting in a bi-phasic mixture with a liquid layer on top. A settlement test was used to quantify separation in said liquid concentrates.

Each tested liquid concentrate was added to a 100 mL graduate cylinder. As settling occurred in the cylinder, volume of said liquid top layer could be continuously recorded until settlement was complete. Test results are shown as top layer volume in total volume of liquid concentrate.

Front Flow Test

Each sample from a Settlement Test was then used in a Front-Flow Test to establish which samples offered minimal settlement while maintaining good flow. Liquid concentrates that had been tested for settling were then emptied, by inversion, over a pre-weighed beaker for one minute; after which, a total mass of liquid concentrate transferred to the beaker was recorded. Any liquid concentrates having good flow and minimal settlement were considered viable formulations for further consideration.

Example 1: Initial Screening of Liquid Concentrate Components

Thickening Agent Screening

Initial screening of thickening agents included xanthan gum, guar gum, carboxymethylcellulose sodium salt, or combinations thereof. A hydrogel was prepared from a 1 wt % liquid concentrate comprising each thickening agent independently, or a combination thereof (see Table 2), by blending the concentrate with water for 10 seconds (1 g of liquid concentrate in 99 g of water).

Xanthan gum and guar gum produced hydrogels very quickly (within 10 seconds using a homogenizer at 8600 rpm), though guar gum's hydrogel was less viscous than that of xanthum gum (Table 2). Carboxymethylcellulose sodium salt did not form a hydrogel after 10 seconds, however a clear hydrogel was obtained after an hour. A combination of guar gum with xanthan gum displayed a synergistic effect with respect to hydrogel formation, an effect that has been previously observed and documented by those skilled in the art [Tako, M. et al. *Carbohydrate Research*, 138 (1985) 207-213].

In a qualitative test, it was observed that hydrogels formed from 1 wt % guar gum and xanthan gum respectively appeared to have a similar consistency and/or viscosity as a hydrogel formed from 1 wt % polyacrylic acid.

Liquid Mediums Screening

For use in liquid concentrates, naturally-sourced and/or biodegradable oils such as, but not limited to, canola oils were considered as liquid mediums due to their expected low cost and relative abundance. Such oils typically have limited solubility in water, however, and as such, water soluble alternatives were also considered, such as, but not limited to, PEG200, PEG300 and glycerol.

Initial Liquid Concentrate Formulations

Using the aforementioned thickening agents and liquid mediums, four formulations were created using a minimum amount of liquid medium, each of which were evaluated by glass adhesion (see Table 3).

As outlined in Table 3, a high adhesion result was obtained from Formulation 2, with canola oil as its liquid medium. Formulation 2 had comparable, if not greater, glass adhesion properties to that of commercial products TetraKO™ and Barricade™. It was observed that Formulations 3 and 4 generated hydrogels more efficiently than other formulations; without wishing to be bound by theory, it was postulated that this was due to PEG200 and glycerol's water miscibility. Further, it has been observed by those skilled in the art that xanthum gum's viscosity and stability increases with addition of electrolytes (e.g. sodium or magnesium salts); as such, magnesium sulfate, sodium sulphate, and borax were used as additives, and the resultant hydrogels tested (see Tables 4 and 5) [Kesavan, S. et al., Macromolecules, 1992, 25, 2026-2032; Rochefort, W. E., J. Rheol. 31, 337 (1987)].

Example 2: Further Screening of Liquid Concentrate Components

Greater glass adhesion on vertical surfaces, and decreased settling of concentrate components, was considered desirable. Without wishing to be bound by theory, it was postulated that natural surfactants, such as, but not limited to, lecithin would slow settlement within the liquid concentrates, and increase concentrate viscosity by acting as a thickening agent. Consequently, both liquid lecithin and solid lecithin were evaluated (see Table 6).

Liquid lecithin dissolved into the liquid medium of each concentrate, and solid lecithin generated a partially dissolved suspension. As indicated in Table 6, concentrates containing lecithin generally experienced less settlement than concentrates without (see Formula 9 and 10). When PEG200 was used as the liquid medium in the presence of lecithin, the liquid concentrate gelled. Three concentrates (Table 6; Formula 3, 5 and 6) experienced minimal settlement while maintaining good flow; these formulations were selected for further testing (see Table 7).

It was observed that combining canola oil and liquid lecithin produced a liquid concentrate with good adhesion (Formula 3, Table 7), and thus that liquid concentrate was further tested with cornstarch (see Table 8); without wishing to be bound by theory, it was expected that cornstarch would increase thickness and/or adhesion of hydrogels at elevated temperatures. Liquid concentrate Formula 1 of Table 8 indicated that addition of 20% cornstarch (relative to xanthan gum in liquid concentrate Formula 3 of Table 7) caused viscosity to increase >5000 cP, and liquid concentrates Formula 4 and 5 demonstrated good adhesion. Further, effect of xanthan gum particle size on concentrate viscosity was also investigated (see Table 9).

Example 3: Increasing Solids Content of Liquid Concentrates

General formulation of liquid concentrate Formula 4 of Table 8 (Xanthan Gum: Guar Gum: Corn Starch: Liquid Soy Lecithin: Liquid Base=1 g: 0.6 g: 0.6 g: 0.1 g: 2.5 mL Canola Oil) was selected for further study to determine what effect increasing materials content would have on a concentrate's viscosity (see Table 10). Liquid concentrate Formula 3 of Table 10 was then selected for field-testing in a fire-fighting backpack and a fire truck. In order to property test the liquid concentrate's efficacy in producing hydrogels with a fire truck, a larger scale concentrate was required.

Example 4: Scaling Up Liquid Concentrates for Fire Truck Testing

Canola-Based Concentrate

A 60 L batch of liquid concentrate Formula 3 of Table 10 was required for fire-truck testing. Preparation of this 60 L concentrate batch was carried out in in 10 L batches, with every two batches being combined and stored in 20 L HDPE plastic pails.

To prepare 10 L of the liquid concentrate, xanthan gum, guar gum and cornstarch were added to a clean 20 L pail and pre-mixed. In a 10 L container, canola oil and liquid lecithin were mixed together with a small paint mixer. The small paint mixer was controlled by an overhead stirrer, of which the stirring speed was varied to achieve the best mixing efficacy. The mixing process continued until all of the liquid lecithin dissolved in the canola oil. The liquid mixture was then added to the dry mixture, and a large paint mixer was used to disperse all dry ingredients evenly throughout the oil medium. The mixer was attached to a hand drill, and the speed was varied to achieve the best mixing efficacy: first a slow speed was used to mix the dry powders with the liquid without generating any "fly-powder", followed by a higher speed to break up and/or disperse the dry ingredients in the liquid; in some instances, it was required to use a combination of slower and higher speeds to break up persisting solid chunks. It took approximately 15 minutes to thoroughly mix all of the dry ingredients with the liquid ingredients to produce a homogeneous liquid concentrate. When two 10 L batches were combined to form a 20 L batch, the large paint mixer was again used to mix the two batches together in each 20 L pail. The resulting 20 L liquid concentrate was given two hours to stabilize from shear thinning before viscosity was tested to ensure consistency (see Table 11). This procedure was repeated three times to acquire the 60 L batch of liquid concentrate required for fire-truck testing. Viscosities measured for each 20 L batch were higher than those observed for smaller samples (e.g. Formula 3. Table 10). Without wishing to be bound by theory, it was postulated that the viscosity difference may be caused by different shear rates involved in mixing liquid concentrates on a 200 g scale versus a 10 L scale. The 20 L batch liquid concentrate was used without any modification.

PEG300-Based Concentrate

A 10 L batch of PEG300-based liquid concentrate was also prepared, following the same procedure outlined above for the 60 L batch of canola-based concentrate. The PEG-based concentrate's final formulation and viscosity is outlined in Table 12.

Example 5: Fire Truck Testing of Large Scale Liquid Concentrates

Canola-Based Concentrate

In-field fire truck testing was completed using an 86 Hahn pumper truck, with a 1500 gallons per min (1500 gal water per min) Hale pump, on open, grass-covered ground. The liquid concentrate was pumped and mixed in-line with water within the fire truck system. After in-line mixing, the resultant hydrogel was sprayed from a fire truck hose onto a vertical glass surface for adhesion testing. Samples were also collected directly from the hose in 4 L beakers for on-site viscosity testing.

Figure 2:
FIG. 2 depicts a glass adhesion test result for a hydrogel formed from a 3 wt % canola-based liquid concentrate.

Initial fire truck testing involved spraying the resultant hydrogel from 100' hoses, though larger hoses, such as 200' hoses, could have been used. Viscosity was tested using a Viscolite 700 viscometer every minute for 10 minutes as the hydrogel was sprayed from the hose (see FIG. 1). Liquid concentrate content was increased from 1 wt % to 3 wt %, and a corresponding increase in hydrogel viscosity was observed. The hydrogels adhered to a glass test surface and formed semi-transparent films with streaks (see FIG. 2). When liquid concentrate content was increased to 4 wt %, viscosity decreased; however, during the glass adhesion test, the resultant hydrogel formed a uniform film that contained no visible streaks.

Figure 3:
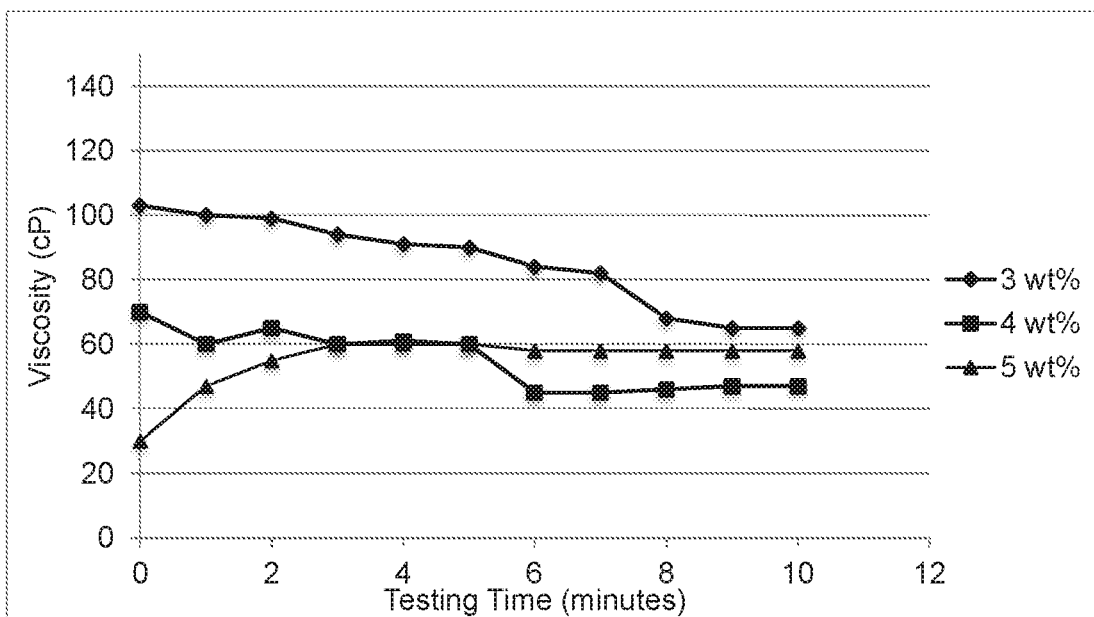
FIG. 3 depicts graphical results of canola-based hydrogels' viscosity changing with time as the hydrogel is being discharged from a 200 ft fire hose.

Following the initial testing, a 200' Hose was used to observe the effect of longer in-line mixing times. The liquid concentrate was tested at 3 wt %, 4 wt % and 5 wt % (see FIG. 3). Viscosity of the formed hydrogels varied in the first 5 minutes, and then tended towards a similar viscosity. During the glass adhesion test, each hydrogel film formed was uniform and thick.

PEG300-Based Concentrate

Figure 4:
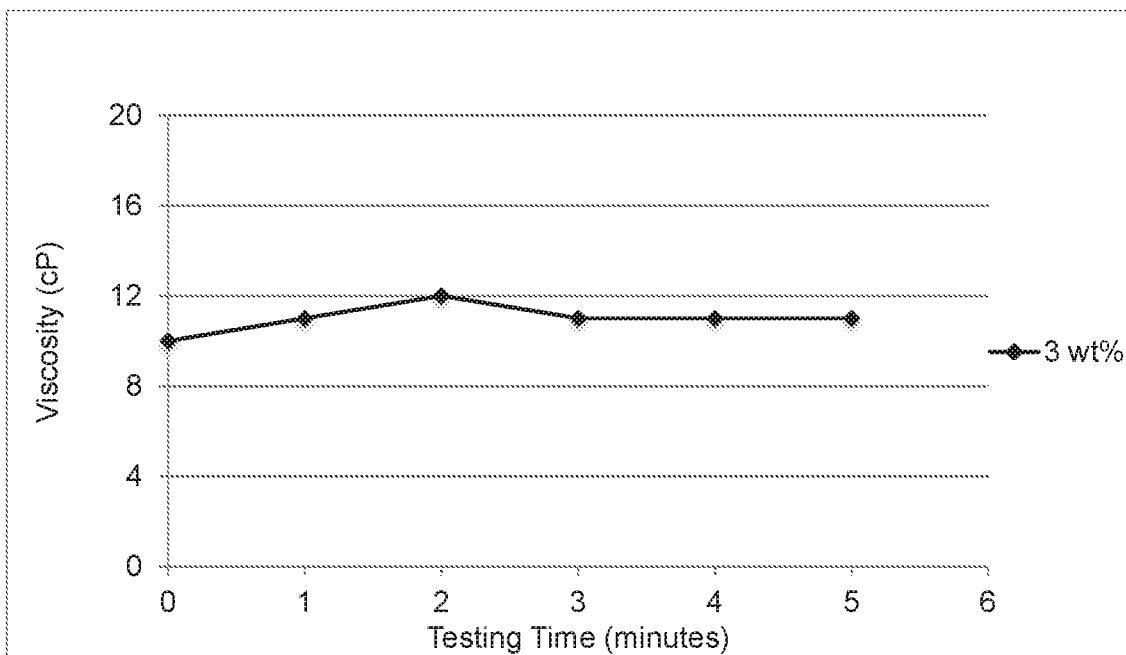
FIG. 4 depicts graphical results of PEG300-based hydrogels' viscosity changing with time as the hydrogel is being discharged from a 200 ft fire hose.

Fire trucking testing of the PEG300-based liquid concentrate was carried out at 3 wt % with a 200 ft hose. During the glass adhesion test, the resultant hydrogel formed films that were uniform, but thinner than those observed for the canola-based hydrogels. Further, the PEG300-based hydrogel viscosity was found to be lower, as compared to the canola-based hydrogels (see FIG. 4).

Example 6: Initial Flame Tests of Initial Liquid Concentrate Hydrogels

For each flame test, a wooden paint stir stick was used in conjunction with a test hydrogel. An end of the wooden stir stick was coated in a hydrogel, and that coated end was then exposed to a flame from a propane torch. How long it took for the stir stick to char and/or catch on fire was recorded (see Table 13).

Example 7: Comparison of Liquid Concentrate/Hydrogel with Current Commercial Products Qualitative tests were performed to compare the herein described liquid concentrates and their resultant hydrogels with two commercially available hydrogels (CAH), which are not composed of 100% naturally-sourced, and/or biodegradable materials: CAH1 (Barricade™) and CAH2 (TetraOK™). These comparative tests were carried out with firefighting backpacks with 10-15 L reservoirs, equipped with hand-pumped spray-nozzles; and, an 86 Hahn pumper truck, with a 1500 gallons per min (1500 gal water per min) hail pump.

With respect to forming a hydrogel from a concentrate, the herein described liquid concentrates were observed to form hydrogels quickly and readily: once the concentrate(s) was added to water, a hydrogel would form/set within seconds, typically 10-15 s. When the concentrate was added to a firefighting backpack's water-filled reservoir, manually shaking the backpack several times (e.g. approximately 3-4 times) was enough to form a hydrogel within the reservoir, and for it to be ready to use as a firefighting agent. When the concentrate was added to a fire truck's external, or on-board tank, it was observed that one person could produce a firefighting hydrogel within minutes, typically <5 min, wherein that time included adding and mixing the liquid concentrate with water or aqueous solution, and allowing time for the hydrogel to set.

In contrast, CAH1 generally took 15-30 min to form a hydrogel from its liquid concentrate; and, once formed, the hydrogel typically exhibited low viscosity, even at a loading of 5 wt % concentrate to water. CAH2 generally required extensive mixing over 8 to 10 min with multiple people's effort (approximately 4 people) to form a hydrogel from its solid, powdered concentrate; often this resulted in 'fly powder', a fine dust that coated surfaces in all directions from point of mixing. It is possible that this fly powder can pose a health hazard to those in the vicinity. Said concentrate-coated surfaces would often convert to hydrogel-coated surfaces due to absorption of moisture from the atmosphere. Further, it was observed that the extensive mixing often failed to produce a homogeneous hydrogel free of un-dissolved clumps of powdered concentrate, even when it was expelled from a fire hose at a pressure of approximately 110 psi and having a length of 200 ft or more, and that the non-homogenous nature of the CAH2 hydrogel often caused blockages in firefighting equipment, such as spray-nozzled backpacks.

It was further observed that the herein described hydrogels offered an improved firefighting/fire-preventing performance, as compared to CAHs 1 and 2, when applied to burning test edifices. For example, it was found that CAH1 had a very low viscosity (i.e., was runny), and did not remain on surfaces for a long enough period of time to be considered an adequate fire-prevention treatment.

In contrast, once applied to a surface, the herein described hydrogels remained on the surfaces to which they were applied, and did not burn away, or drip off a surface as quickly as was observed for CAH1 and/or CAH2. Further, it was observed that the herein described hydrogels had a tendency to 'creep' or 'ooze' into cracks, fissures, holes in an edifice as it was applied, and then stay there: it would remain less viscous for several seconds (approximately 12 s), allowing it to enter any cracks or breaks in an edifice, before its viscosity increased again due to a lack of shear forces. Such behaviour could allow the herein described hydrogels to be used for penetrative firefighting, fire-containment, and/or fire-prevention; this behaviour, for example, could aid in extinguishing burning hay-filled barns, where having a fire-fighting agent that could penetrate into, and coat, a large Smouldering hay pile would likely be beneficial.

It was found that, in applying these hydrogels to surfaces, they could be applied via a straight steam, as is typically employed in fire-fighting with water, or with a slight fog (percent deviation from the straight stream of water); a 30-40 degree fog pattern was found to provide a uniform application of hydrogel onto most surfaces, and penetrative fire-fighting was often well achieved with a straight stream. Further, it was observed that a 'coat and approach' technique to fire-fighting, suppression, and prevention with the hydrogels described herein was often successful: coating any unburned areas with hydrogel to prevent them from catching fire, which further provided firefighters with a safe means of egress. Coating surfaces with the hydrogels as described herein was found to smother the surface, displacing oxygen a fire could use to burn, and was found to cool the surface, thereby preventing the surface from becoming a potential fuel source.

TABLE 1

General formulations of select liquid concentrates

| Liquid Concentrate | General Formulation |
|---|---|
| 1 | Natural Gums + Starches + Vegetable Oil + Surfactant |
| 2 | Natural Gums + Starches + PEG + Surfactant |
| 3 | Natural Gums + Starches + Glycerol + Surfactant |
| 4 | Natural Gums + Starches + Vegetable Oil + PEG + Surfactant |

TABLE 2

Thickening Agent Screening Results

| Formula | Hydrogel Material | Hydrogel Set-up |
|---|---|---|
| 1 | Xanthan gum | Yes |
| 2 | Guar gum | Yes, but less viscous |
| 3 | Xanthan gum + Guar gum (1:1) | Yes |
| 4 | Carboxymethylcellulose sodium salt | Yes, after an hour |

TABLE 3

Initial Liquid Concentrate Formulations and Test Results

| Formula | Liquid Concentrate | wt %* | Adhesion (g) |
|---|---|---|---|
| 1 | Xanthan Gum:Corn Starch:Canola Oil = 1 g:1 g:2.5 mL | 4 | 0.45 |
| 2 | Xanthan Gum:Guar Gum:Canola Oil = 1 g:1 g:2.5 mL | 3 | 0.62 |
| 3 | Xanthan Gum:Guar Gum:PEG200 = 1 g:1 g:2.5 mL | 3 | 0.38 |
| 4 | Xanthan Gum:Guar Gum:Glycerol = 1 g:1 g:2.5 mL | 3 | 0.29 |
| 5 | TetraKO ™ (liquid concentrate) | 1 | 0.61 |
| 6 | Barricade ™ (liquid concentrate) | 1 | 0.29 |

Note:
*Wt % is mass of liquid concentrate applied for preparing a hydrogel

TABLE 4

PEG/Glycerol-Based Hydrogel with Salt Additive Adhesion Test

| Formula | Liquid Concentrate Formulation | $Na_2SO_4$ | Adhesion (g) |
|---|---|---|---|
| 1 | Xanthan Gum:Guar Gum:PEG200 = 1 g:1 g:2.5 mL | 0 | 0.38 |
| 2 | Xanthan Gum:Guar Gum:PEG200 = 1 g:1 g 2.5 mL | 0.1 wt % | 0.39 |
| 3 | Xanthan Gum:Guar Gum:Glycerol = 1 g:1 g:2.5 mL | 0 | 0.29 |
| 4 | Xanthan Gum:Guar Gum:Glycerol = 1 g:1 g:2.5 mL | 0.1 wt % | 0.33 |

Note:
Salt content is 0.1 wt % of liquid concentrate applied; all hydrogels were prepared with 3 wt % liquid concentrate mixing with water.

TABLE 5

Canola-Based Hydrogel with Salt Additive Adhesion Test

| Formula | Liquid Concentrate Formulation | Salt (0.1 wt %) | Adhesion (g) |
|---|---|---|---|
| 1 | 1 wt % Xanthan Gum:Corn Starch:Canola Oil = 1 g:1 g:2.5 mL | 0 | 0.35 |
| 2 | 1 wt % Xanthan Gum:Corn Starch:Canola Oil = 1 g:1 g:2.5 mL | $Na_2SO_4$ | 0.37 |
| 3 | 1 wt % Xanthan Gum:Corn Starch:Canola Oil = 1 g:1 g:2.5 mL | $MgSO_4$ | 0.19 |
| 4 | 2 wt % Xanthan Gum:Corn Starch:Canola Oil = 1 g:1 g:2.5 mL | $Na_2SO_4$ | 0.55 |
| 5 | 2 wt % Xanthan Gum:Corn Starch:Canola Oil = 1 g:1 g:2.5 mL | $MgSO_4$ | 0.41 |
| 6 | 3 wt % Xanthan Gum:Corn Starch:Canola Oil = 1 g:1 g:2.5 mL | 0 | 0.62 |
| 7 | 3 wt % Xanthan Gum:Corn Starch:Canola Oil = 1 g:1 g:2.5 mL | $Na_2SO_4$ | 0.64 |
| 8 | 3 wt % Xanthan Gum:Corn Starch:Canola Oil = 1 g:1 g:2.5 mL | $MgSO_4$ | 0.62 |

Note:
Salt content is 0.1 wt % of liquid concentrate applied.

TABLE 6

Settlement and Front-Flow of Liquid Concentrates after Lecithin Addition

| Formula | Xanthan Gum:Guar Gum:Soy Lecithin:Liquid Base | Settlement* (%) | Front-flow (g) |
|---|---|---|---|
| 1 | 1 g:1 g:0.1 g (solid):2.5 mL Canola Oil | 23** | 26.54 |
| 2 | 1 g:1 g:0.2 g (solid):2.5 mL Canola Oil | 16 | 38.31 |
| 3 | 1 g:1 g:0.1 g (liquid):2.5 mL Canola Oil | 6 | 61.50 |
| 4 | 1 g:1 g:0.2 g (liquid):2.5 mL Canola Oil | 0 | 18.44 |
| 5 | 1 g:1 g:0.1 g (solid):3 mL PEG200 | 9 | 70.93 |
| 6 | 1 g:1 g:0.2 g (solid):3 mL PEG200 | 1 | 72.82 |
| 7 | 1 g:1 g:0.1 g (liquid):3 mL PEG200 | 0 | 9.37 |
| 8 | 1 g:1 g:0.2 g (liquid):3 mL PEG200 | 0 | 0 |
| 9 | 1 g:1 g:0:2.5 mL Canola Oil | 21 | n/a |
| 10 | 1 g:1 g:0:3 mL PEG200 | 18 | n/a |

Note:
Size of xanthan gum and guar gum is 200 mesh (74 micrometers);
*The test was lasted for 5 days till settlement completion;
**% settlement was considered to be within experimental error of Formula 9;
Volume % = (top liquid layer volume/total volume) × 100%.

TABLE 7

Viscosity and Adhesion of Select Liquid Concentrates

| Formula | Xanthan Gum:Guar Gum:Soy Lecithin:Liquid Base | Viscosity (cP) | Adhesion (g) |
|---|---|---|---|
| 3; Table 6 | 1 g:1 g:0.1 g (liquid):2.5 mL Canola Oil | 4000 | 0.82 |
| 5; Table 6 | 1 g:1 g:0.1 g (solid):3 mL PEG200 | 7100 | 0.72 |
| 6; Table 6 | 1 g:1 g:0.2 g (solid):3 mL PEG200 | 9300 | 0.54 |
| Commercial | TetraKO ™ Liquid Concentrate | 8600 | n/a |
| Commercial | Barricade ™ Liquid Concentrate | 2900 | n/a |

Note:
All adhesion tests were carried out using hydrogels prepared with 3 wt % liquid concentrate.

TABLE 8

Effect of Starch on Liquid Concentrate Viscosity and Adhesion

| Formula | Xanthan Gum:Guar Gum:Corn Starch:Liquid Soy Lecithin:Liquid Base | Viscosity (cP) | Adhesion (g) |
|---|---|---|---|
| 1 | 1 g:1 g:0.2 g:0.1 g:2.5 mL Canola Oil | 8100 | N/A |
| 2 | 1 g:0.5 g:0.5 g:0.1 g:2.5 mL Canola Oil | 3100 | 0.72 |
| 3 | 1 g:0 g:1 g:0.1 g:2.5 mL Canola Oil | 1700 | 0.53 |
| 4 | 1 g:0.6 g:0.6 g:0.1 g:2.5 mL Canola Oil | 3100 | 0.78 |

TABLE 8-continued

Effect of Starch on Liquid Concentrate Viscosity and Adhesion

| Formula | Xanthan Gum:Guar Gum:Corn Starch:Liquid Soy Lecithin:Liquid Base | Viscosity (cP) | Adhesion (g) |
|---|---|---|---|
| 5 | 1 g:0 g:1 g:0.08 g:2 mL Canola Oil | 3400 | 0.83 |
| 6 | 1 g:0.5 g:0.5 g:0.025 g:3 mL PEG300 | 7200 | 0.70 |

Note:
Size of xanthan gum is 200 mesh (74 micrometers).

TABLE 9

Effect of Xanthan Gum Particle Size on Viscosity

| Xantham Gum Particle Size | Liquid Concentrate Formulation | Viscosity (cP) |
|---|---|---|
| 200 μm | Xanthan Gum:Guar Gum:Liquid Soy Lecithin:Canola Oil = 1 g:1 g:0.1 g:2.5 mL | 4000 |
| 80 μm | Xanthan Gum:Guar Gum:Liquid Soy Lecithin:Canola Oil = 1 g:1 g:0.1 g:2.5 mL | 3200 |

TABLE 10

Effect on Viscosity of Increasing Solids Content in Liquid Concentrates

| Formula | Xanthan Gum:Guar Gum:Corn Starch:Liquid Lecithin:Canola Oil | Viscosity (cP) |
|---|---|---|
| 1 | 1 g:0.7 g:0.7 g:0.1 g:2.5 mL | 3400 |
| 2 | 1 g:0.8 g:0.8 g:0.1 g:2.5 mL | 6000 |
| 3 | 1 g:0.75 g:0.75 g:0.1 g:2.5 mL | 4500 |
| 4 | 1 g:0.6 g:0.8 g:0.1 g:2.5 mL | 4600 |
| 5 | 1 g:0.6 g:0.9 g:0.1 g:2.5 mL | 5300 |

TABLE 11

Viscosities of Each 20 L Batch of Canola Oil-Based Liquid Concentrate

| Pail | Xanthan Gum:Guar Gum:Corn Starch:Liquid Lecithin:Canola Oil | Viscosity (cP) |
|---|---|---|
| 1 | 1 g:0.7 g:0.7 g:0.1 g:2.5 mL | 7200 |
| 2 | | 7200 |
| 3 | | 6500 |

TABLE 12

PEG300-Based Liquid Concentrate Formulation and Viscosity

| Formula | Xanthan Gum:Guar Gum:Corn Starch:Liquid Lecithin:PEG300 | Viscosity (cP) |
|---|---|---|
| 1 | 1 g:0.5 g:0.5 g:0.03 g:4 mL | 3500 |

TABLE 13

Initial Flames Tests using Initial Hydrogel Formulations

| Sample | Concentrate Formulation | Time before Wood Burnt (B) or Charred (C) |
|---|---|---|
| 1 | 2 g Xanthan Gum:2 g Corn Starch:5 mL Canola Oil:200 mL Water | 15 s (B) |
| 2 | 2 g Xanthan Gum:5 mL PEG200:200 mL Water | 30 s (C) |

TABLE 13-continued

Initial Flames Tests using Initial Hydrogel Formulations

| Sample | Concentrate Formulation | Time before Wood Burnt (B) or Charred (C) |
|---|---|---|
| 3 | 2 g Carboxymethyl cellulose sodium salt:4 mL PEG200:200 mL Water | 20 s (C) |
| 4 | 2 g Xanthan Gum:1 g Corn Starch:5 mL Canola Oil:200 mL Water | 16 s (B) |
| 5 | Barricade ™ Hydrogel (1 wt % of liquid conc.) | 15 s (B) |
| 6 | TetraKO ™ Hydrogel (1 wt % of liquid conc.) | 50 s (C) |
| 7 | TetraKO ™ Hydrogel (1 wt % of dry powder) | N/A |

Note:
N/A- Hydrogel from TetraKO dry powder was very thick; only little char was observed on gel surface in testing time (over 1 minute); volume of canola oil or PEG200 was volume limit for wetting dry ingredients.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A hydrogel, comprising:
   (i) about 0.1-30 wt % of a composition comprising:
   (a) 10-75 wt % of at least one naturally-sourced thickening agent;
   (b) 15-90 wt % of at least one liquid medium, wherein the liquid medium is an edible oil, glycerol, low molecular weight polyethylene glycol (PEG), or combination thereof; and
   (c) at least one suspending agent,
   wherein the composition consists of >85%, by weight, food-grade components; and
   (ii) 70-99.9 wt % of water or an aqueous solution,
   wherein the hydrogel is a water-enhancing, fire-suppressant, useful for fire-fighting, fire-suppression, and/or fire-prevention,
   wherein the hydrogel does not comprise a thickening agent that is toxic, and
   wherein the hydrogel does not comprise a thickening agent that is not biodegradable.

2. The hydrogel of claim 1, wherein the weight percentage of the composition is from about 0.1 wt % to about 10 wt %.

3. The hydrogel of claim 2, wherein the weight percentage of the composition is from about 0.1 wt % to about 5 wt %.

4. The hydrogel of claim 1, wherein the hydrogel's viscosity is 30 cP or greater when measured with a Viscolite 700 viscometer.

5. The hydrogel of claim 1, wherein the composition comprises up to 10 wt % of said at least one suspending agent.

6. The hydrogel of claim 1, wherein the composition further comprises one or more additives.

7. The hydrogel of claim 6, wherein the one or more additives is a sodium salt, a magnesium salt, chitosan, epsilon polylysine, pectin, or a combination thereof.

8. The hydrogel of claim 7, wherein the sodium salt is sodium bicarbonate.

9. The hydrogel of claim 1, wherein the at least one thickening agent comprises a gum, a starch or a combination of a gum and a starch.

10. The hydrogel of claim 9, wherein the gum is guar gum, xanthan gum, sodium alginate, agar, locust bean gum, or a combination thereof.

11. The hydrogel of claim 9, wherein the starch is cornstarch, potato starch, tapioca, rice starch, or a combination thereof.

12. The hydrogel of claim 1, wherein the suspending agent is a surfactant, emulsifier or both.

13. The hydrogel of claim 1, wherein the suspending agent is lecithin, lysolecithin, polysorbate, sodium caseinate, monoglyceride, fatty acid, fatty alcohol, glycolipid, protein, or a combination thereof.

14. The hydrogel of claim 1, wherein each of said at least one liquid medium is an edible oil, and the edible oil is a nut oil, seed oil, plant oil, vegetable oil, canola oil, or combination thereof.

15. The hydrogel of claim 1, wherein the composition comprises xanthan gum, guar gum, cornstarch, and canola oil.

16. The hydrogel of claim 15, wherein the composition comprises:
   15-25 wt % xanthan gum;
   10-20 wt % guar gum;
   10-20 wt % cornstarch; and
   30-64 wt % canola oil.

17. The hydrogel of claim 1, wherein the aqueous solution comprises glycerol.

18. The hydrogel of claim 1, wherein the composition consists of >90%, by weight, biodegradable food-grade components.

19. A method of making a water-enhancing, fire-suppressing hydrogel comprising:
   combining water or an aqueous solution with about 0.1-30 wt % of a composition comprising:
   (a) 10-75 wt % of at least one naturally-sourced thickening agent;
   (b) 15-90 wt % of at least one liquid medium, wherein the liquid medium is an edible oil, glycerol, low molecular weight polyethylene glycol (PEG), or combination thereof; and
   (c) at least one suspending agent,
   wherein the composition consists of >85%, by weight, food-grade components and wherein mixture of said composition with water or an aqueous solution forms a fire-suppressing, water-enhancing hydrogel; and
   mixing the composition and aqueous solution to obtain an essentially homogeneous hydrogel, wherein the hydrogel does not comprise a thickening agent that is toxic, and wherein the hydrogel does not comprise a thickening agent that is not biodegradable.

20. The method of claim 19, wherein the composition's weight percentage is from about 0.1 to about 10 wt %.

21. The method of claim 20, wherein the composition's weight percentage is from about 0.1 wt % to about 5 wt %.

22. The hydrogel of claim 1, wherein each of the at least one thickening agent, suspending agent and liquid medium is biodegradable.

23. The method of claim 19, wherein each of the at least one thickening agent, suspending agent and liquid medium is biodegradable.

24. The hydrogel of claim 1, wherein the hydrogel does not comprise a liquid medium that is toxic, and wherein the hydrogel does not comprise a liquid medium that is not biodegradable.

25. The hydrogel of claim 1, wherein the hydrogel does not comprise a suspending agent that is toxic, and wherein the hydrogel does not comprise a suspending agent that is not biodegradable.

\* \* \* \* \*